United States Patent
Burriss et al.

(10) Patent No.: US 10,148,750 B1
(45) Date of Patent: Dec. 4, 2018

(54) SERVICES MOBILITY IN STORAGE SYSTEMS

(71) Applicant: EMC Corporation, Hopkinton, MA (US)

(72) Inventors: Michael L. Burriss, Raleigh, NC (US); Derek M. Scott, Raleigh, NC (US); Jason L. Taylor, Apex, NC (US); Wai C. Yim, Merrimack, NH (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 759 days.

(21) Appl. No.: 14/573,320

(22) Filed: Dec. 17, 2014

(51) Int. Cl.
*H04L 29/08* (2006.01)
*G06F 3/06* (2006.01)

(52) U.S. Cl.
CPC .......... *H04L 67/1095* (2013.01); *G06F 3/067* (2013.01); *G06F 3/0614* (2013.01); *G06F 3/0647* (2013.01)

(58) Field of Classification Search
None
See application file for complete search history.

(56) References Cited

U.S. PATENT DOCUMENTS

| | | | |
|---|---|---|---|
| 6,954,768 B2 * | 10/2005 | Carlson | G06F 3/0605 |
| 8,180,813 B1 | 5/2012 | Goodson et al. | |
| 8,959,242 B1 * | 2/2015 | Barrall | H04L 67/06 |
| | | | 707/726 |
| 9,325,791 B1 * | 4/2016 | Blahaerath | H04L 67/1097 |
| 2010/0191783 A1 * | 7/2010 | Mason | G06F 17/30088 |
| | | | 707/822 |
| 2011/0016085 A1 | 1/2011 | Kuo et al. | |
| 2012/0226669 A1 * | 9/2012 | Jess | G06F 17/303 |
| | | | 707/691 |
| 2013/0262801 A1 * | 10/2013 | Sancheti | G06F 3/065 |
| | | | 711/162 |
| 2015/0355968 A1 * | 12/2015 | Taylor | G06F 11/1092 |
| | | | 714/6.23 |

(Continued)

OTHER PUBLICATIONS

Toponce, Aaron. "ZFS Administration, Part V—Exporting and Importing zpools", Aaron Toponce Website, Dec. 10, 2012, [retrieved on Jul. 30, 2018]. Retrieved from the Internet: <URL: https://pthree.org/2012/12/10/zfs-administration-part-v-exporting-and-importing-zpools/>. (Year: 2012).*

*Primary Examiner* — SM A Rahman
*Assistant Examiner* — Dae Kim
(74) *Attorney, Agent, or Firm* — BainwoodHuang

(57) ABSTRACT

While providing a storage service to a client system, a storage system maintains a complete set of storage service metadata for the service on the same storage device that stores the user data received from the client system. When an event is detected that requires the storage service to be moved to a new storage system, the storage service can be moved to a new storage system by moving the storage device containing both the user data and the storage service metadata to the new storage system. The new storage system detects the storage device that has been moved, and detects the storage service metadata and user data. The new storage system then uses the storage service metadata and user data from the storage device to immediately reestablish the storage service with the client system, without having to perform a separate step of copying the storage service metadata from the previous storage system.

22 Claims, 6 Drawing Sheets

(56) References Cited

U.S. PATENT DOCUMENTS

2015/0381725 A1* 12/2015 Haapaoja ............ H04L 67/1097
709/213
2016/0011816 A1* 1/2016 Aizman ................ G06F 3/0604
711/117

* cited by examiner

SERVICES MOBILITY IN STORAGE SYSTEMS

BACKGROUND

As it is generally known, various types of storage services can be used to provide external data storage from storage server systems ("storage systems") to client computer systems ("client systems"). For example, Network-Attached Storage (NAS) systems provide file-based storage services to client systems over a network. File-based storage services provide external storage to client systems in the form of externally stored files, so that the users of the client systems can access the files as if they were located on the local storage of the client system. NAS systems may use various specific protocols to provide file-based storage services to a client system, including but not limited to the Network File System (NFS) distributed file system protocol, the Server Message Block (SMB)/Common Internet File System (CIFS) application-layer network protocol, and/or Apple Filing Protocol (AFP).

Block-based storage services provide external storage in the form of blocks served by storage systems from remote disk storage devices. For example, block-based storage services may employ the Internet Small Computer System Interface (iSCSI). iSCSI is an Internet Protocol (IP)-based storage networking standard for linking data storage resources, and allows a client system to access external storage from the storage system as if it were from a locally attached disk. Block-based storage services may also use Fibre Channel (FC) network technology, and/or the Serial Attached SCSI (SAS) protocol or the like in the context of Direct Attached Storage (DAS).

While providing a storage service to one or more users, some storage systems maintain metadata related to the service being provided. This metadata may include various specific types of information associated with providing the service. In existing systems, this "storage service metadata" is stored by the storage system separately and independently from the storage device that is used to supply the external storage for storing user data from the client system.

SUMMARY

The above described prior approaches to maintaining storage service metadata have significant drawbacks. For example, certain events may occur that require one or more previously established storage services to be moved from one storage system to a different storage system. When such an event occurs, the user data stored using the service must be moved to the new storage system, and the service re-started on the new storage system. In order to restart the service on the new storage system, previous approaches have required that the storage service metadata be copied from the original storage system to the new storage system in a separate, additional step or process. Such copying of the storage service metadata from the old storage system to the new storage system is time consuming, and delays resumption of the storage service on the new storage system. Moreover, the new storage system cannot independently recreate metadata that is known only by the original storage system without somehow accessing that metadata either on or through the original storage system.

To address these and other shortcomings of previous approaches, a new system for providing services mobility across different storage systems is disclosed. In the disclosed system, storage service metadata required to provide a storage service to one or more users is maintained by the storage system on a storage device that also contains the user data stored for the user(s) of the service. When an event occurs that requires the storage service to be moved to a new storage system, the storage device containing both the user data and the storage service metadata for the service may be moved to the new storage system. The new storage system detects that the storage device has been moved to it, and scans the contents of the storage device. The new storage system detects the storage service metadata and user data on the newly arrived storage device. The new storage system then uses the storage service metadata and user data on the storage device to quickly reestablish the storage service with the client system, advantageously without having to perform a separate step of copying the storage service metadata from the previous storage system. In this way the overhead and delay associated with the requirement of a separate step of copying metadata from the original storage system to the new storage system is avoided, and the disclosed system reduces any concomitant interruption to the storage service.

Thus there is disclosed a new approach to providing services mobility between storage systems that avoids the costs associated with separately copying storage service metadata from an original storage system to a new storage system when a previously established storage service is moved. The disclosed system enables the service to be quickly re-started on the new storage system in response to the storage device containing the metadata and the user data being moved to the new storage system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
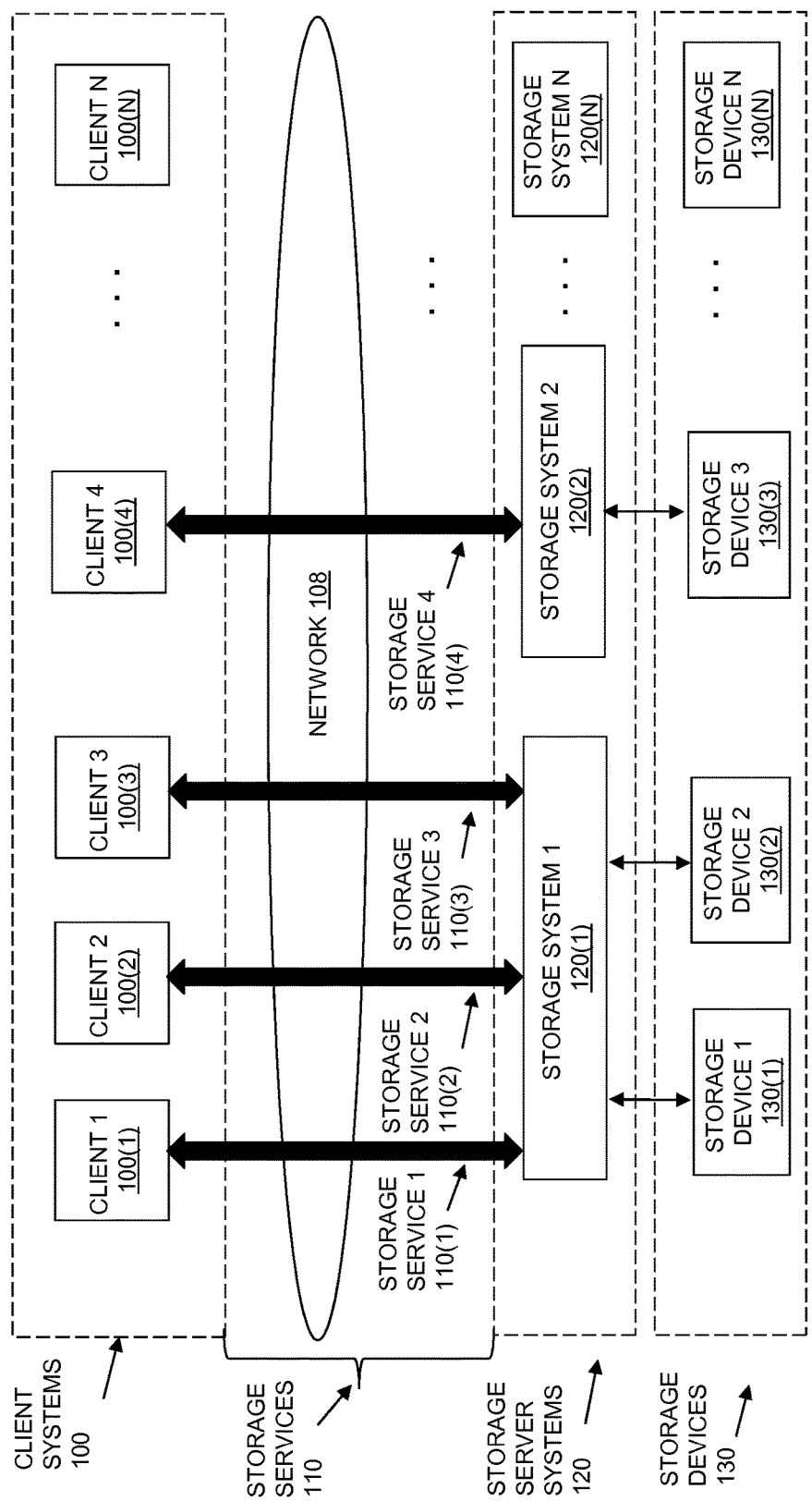
FIG. 1 is a block diagram showing a first example of components in an illustrative embodiment.

FIG. 1 is a block diagram showing a first example of components in an illustrative embodiment. In the embodiment of FIG. 1, Client Systems 100, shown including Client 1 100(1) through Client N 100(N), are provided Storage Services 110 from Storage Server Systems 120, which include Storage System 1 120(1) through Storage System N 120(N). The Storage Services 110 are provided between the Storage Server Systems 120 and the Client Systems 100 over one or more data communication networks, shown as Network 108.

Specifically, Storage System 1 120(1) provides Storage Service 1 110(1) to Client 1 100(1), Storage Service 2 110(2) to Client 2 100(2), and Storage Service 3 110(3) to Client 3 100(3). Storage System 2 120(2) provides Storage Service 4 110(4) to Client 4 100(3).

The embodiment of FIG. 1 further includes Storage Devices 130, shown including Storage Device 1 130(1) through Storage Device N 130(N). Specifically, Storage Device 1 130(1) and Storage Device 2 130(2) are attached to or associated with Storage System 1 120(1), and Storage Device 3 130(3) is attached or associated with to Storage System 2 120(2).

While Storage Device 1 130(1) and Storage Device 2 130(2) are shown directly physically connected to Storage System 1 120(1), and Storage Device 3 130(3) is shown directly physically connected to Storage System 2 120(2), the disclosed system is not so limited. In an alternative embodiment, Storage Device 1 130(1), Storage Device 2 130(2) and Storage Device 3 130(3) are all communicably connected to both Storage System 1 120(1) and Storage System 2 120(2) by way of one or more communication networks, e.g. including or consisting of a Storage Area Network (SAN) or the like. In such an embodiment, in FIG. 1 Storage Device 1 130(1) and Storage Device 2 130(2) are initially assigned or otherwise configured (e.g. through settings in configuration software, firmware, and/or configuration switches) so that they are used only by Storage System 1 120(1), and Storage Device 3 130(3) is similarly initially assigned or otherwise configured so that it is used only by Storage Device 2 130(2).

During operation of the embodiment shown in FIG. 1, while providing Storage Service 1 110(1) to Client 1 100(1) and Storage Service 2 110(2) to Client 2 100(2), Storage System 1 120(1) allocates units of storage from Storage Device 1 130(1) to store user data received from Client 1 100(1) and Client 2 100(2). While providing Storage Service 3 110(3) to Client 3 100(3), Storage System 1 120(1) allocates units of storage from Storage Device 2 130(2) to store user data received from Client 3 100(3). Similarly, while providing Storage Service 4 110(4) to Client 4 100(4), Storage System 2 120(2) allocates units of storage from Storage Device 3 130(3) to store user data received from Client 3 100(3)

While providing Storage Services 110 to Client Systems 100, each of Storage Server Systems 120 maintains a complete set of metadata associated with the respective storage service on the storage device on which the user data is stored for that storage service. For example, while providing Storage Service 1 110(1) to Client 1 100(1) and Storage Service 2 110(2) to Client 2 100(2), Storage System 1 120(1) maintains a complete set of metadata for Storage Service 1 110(1), and a complete set of metadata for Storage Service 2 110(2), on Storage Device 1 130(1). While providing Storage Service 3 110(3) to Client 3 100(3), Storage System 1 120(1) maintains a complete set of metadata for Storage Service 3 110(3) on Storage Device 2 130(2). And Storage System 2 120(2) maintains a complete set of metadata for Storage Service 4 on Storage Device 3 while providing Storage Service 4 110(4) to Client 4 100(4).

Various events or conditions may occur that require a previously established storage service to be moved from an original storage system to a new storage system. For example, it may be desirable to move a storage service to a different storage system in order to improve the level of external storage performance provided to the client system and the users of the client system. Such a storage service move may, for example, be performed in response to automatically determining (e.g. by software or firmware executing on the storage system or elsewhere) that a guaranteed level of service is not being provided by the original storage system.

Another such situation may arise when a storage system experiences a failure of some kind. In that case, a storage service may need to be moved from the failing storage system to a different, fully functional storage system. It may also be desirable to move a storage service to a different storage system in order to provide load balancing across multiple storage systems. Those skilled in the art will recognize that other conditions may arise that require a storage service to be moved from one storage system to another.

In the example of FIG. 1, for purposes of explanation, Storage System 1 120(1) initially provides three storage services (i.e. Storage Service 1 110(1), Storage Service 2 110(2), and Storage Service 3 110(3)), while Storage System 2 provides two storage services (i.e. Storage Service 4 110(4)). Accordingly, in order to more evenly distribute the storage service workload between Storage System 1 120(1) and Storage System 2 120(2), it may be desirable to move one or more of the storage services from Storage System 1 120(1) to Storage System 2 120(2). Such a load balancing determination may further be responsive to the specific activity or bandwidth levels associated with providing each of the respective storage services, and/or the currently available capacity of each of the respective storage systems.

In accordance with the disclosed system, one or more of the storage services provided by Storage System 1 120(1) may be moved from Storage System 1 120(1) by moving the storage device holding the user data and storage service metadata for those service(s) to a different storage system. In accordance with the example shown in FIG. 1, Storage Service 1 110(1) and Storage Service 2 110(2) may be moved together from Storage System 1 120(1) to another storage system by moving Storage Device 1 130(1) to the other storage system. Similarly, Storage Service 3 110(3) may be moved to another storage system by moving Storage Device 2 130(2) to the other storage system.

Figure 2:
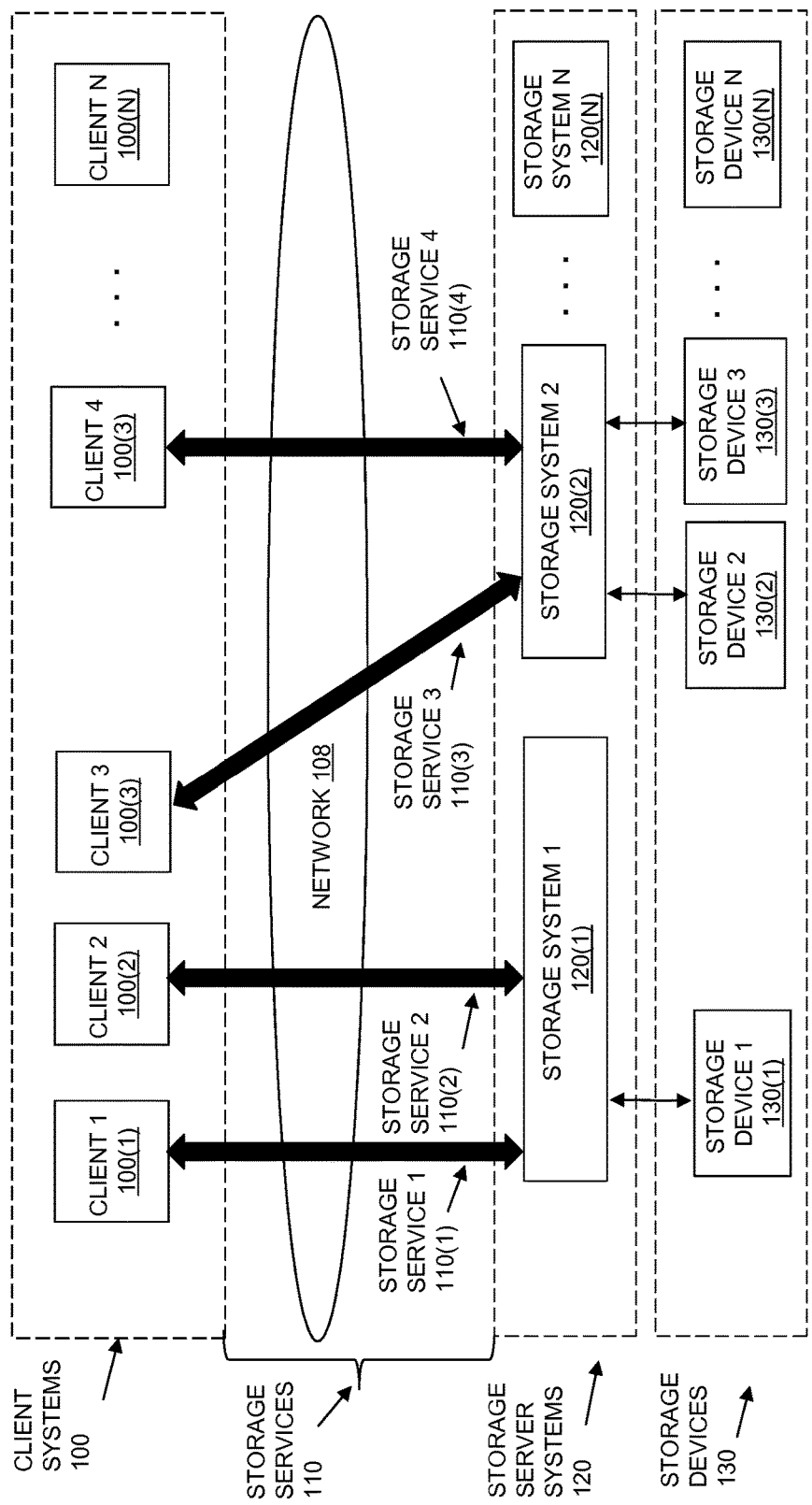
FIG. 2 is a block diagram showing a second example of components in an illustrative embodiment, in which a storage device has been moved from a first storage system to a second storage system.

FIG. 2 is a block diagram showing the components of the illustrative embodiment of FIG. 1, after Storage Device 2 130(2) has been moved from Storage System 1 120(1) to Storage System 2 120(2). For example, Storage Device 2 130(2) may be moved from Storage System 1 120(1) to Storage System 2 120(2) by physically disconnecting Storage Device 2 130(2) from Storage System 1 120(1), and then physically re-connecting Storage Device 2 130(2) directly to Storage System 2 120(2). Alternatively, in an embodiment in which Storage Device 2 130(2) is communicably connected to both Storage System 1 120(1) and Storage System 2 120(2) by way of a SAN or the like, Storage Device 2 130(2) may be moved from Storage System A 16 to Storage System B 18 by reassigning Storage Device 2 130(2), and/or reconfiguring Storage Device 2 130(2), Storage System 1 120(1) and/or Storage System 2 120(2) (e.g. through changing settings in configuration software, firmware, and/or configuration switches), such that Storage Device 2 130(2) is no longer available to Storage System 1 120(1), but instead is available only to Storage System 2 120(2), without having to physically disconnect and reconnect Storage Device 2 130(2). In another alternative embodiment, in which a mirrored copy of Storage Device 2 130(2) is maintained by Storage System 2 120(2) (e.g. on Storage Device 3 130(3)), moving Storage Device 2 130(2) to Storage System 2 120(2) may involve activating the mirrored copy of Storage Device 2 130(2) on Storage System 2 120(2), for example as a form of fault recovery in response to automatic detection of a failure of Storage Device 2 130(2) and/or Storage System 1 120(1).

In response to detecting that Storage Device 2 130(2) has been moved to Storage System 2 120(2), Storage System 2 120(2) scans the contents of Storage Device 2 130(2). Storage System 2 120(2) then detects that both the user data and metadata for Storage Service 3 110(3) are stored on Storage Device 2 130(2). In response to detecting that both the user data and metadata for Storage Service 4 110(4) are stored on Storage Device 2 130(2), Storage System 2 120(2) uses the metadata to re-establish Storage Service 3 26 between Storage System 2 120(2) and Client 3 100(3), so that Storage Service 3 26 can continue to be provided to Client 3 100(3) based in part on the user data previously stored on Storage Device 2 130(2).

The illustrative Client Systems 100 shown in FIGS. 1 and 2 may be any specific type of computer system or device that consumes external storage provided through a storage service. For example, each of Client Systems 100 may include at least one processor, program storage, such as memory and/or another computer readable medium, for storing program code executable on the processor, and for storing data operated on by such program code. Each of Client Systems 100 may further include one or more input/output devices and/or interfaces, such as data communication and/or peripheral devices and/or interfaces. The program code executing on Client Systems 100 may further include appropriate operating system and/or client application software that provides and/or uses one or more of the Storage Services 110. Alternatively, each of Client Systems 100 may consist of, or include software that executes in whole or in part on, one or more virtual machines that are provided using a hypervisor or the like.

The Storage Server Systems 120 may also each include at least one processor and program storage, such as memory and/or another computer readable medium, for storing program code executable on the processor, and for storing data operated on by such program code. Each of the Storage Server Systems 120 may further include one or more input/output devices and/or interfaces, such as data communication and/or peripheral devices and/or interfaces. The program code executing on each of the Storage Server Systems 120 may include software or firmware that provides one or more Storage Services 110. Alternatively, one or more of the Storage Server Systems 120 may consist of, or include server software that executes, in whole or in part, on one or more server computer systems, or on virtual machines that are provided using a hypervisor or the like. In another embodiment, the Storage Server Systems 120 may be embodied in whole or in part as storage appliances, such as Network Attached Storage (NAS) appliances, i.e. specialized devices having integrated software, firmware, and/or hardware designed specifically for storing and serving files and/or blocks of data storage as need to support one or more specific storage services.

Each of the Storage Devices 130 shown in FIG. 1 may be embodied using any specific kind of data storage mechanism, including but not limited to one or more non-volatile storage devices, such as magnetic disk drives, electronic flash drives, and/or optical drives.

Each of the Storage Services 110 may be embodied as any specific type of storage service that provides units of external storage to a client system from a storage server. For example, one or more of Storage Services 110 may be embodied as file-based storage services that provide external storage of files for a respective client system, while allowing the externally stored files to be accessed as if they were located on the client system's local storage. Such file-based storage services may be based on the Network File System (NFS) protocol, the Server Message Block (SMB) or Common Internet File System (CIFS) application-layer network protocol, the Apple Filing Protocol (AFP), or other appropriate protocols.

One or more the of Storage Services 110 may alternatively be embodied as block-based storage services that provide external storage in the form of blocks served by storage systems from disk storage devices. For example, one or more of Storage Services 110 may be embodied as block-based storage services employing the Internet Small Computer System Interface (iSCSI), and allowing the respective client system to access external storage from the storage system as if it were from a locally attached disk. Such block-based storage services may also use Fibre Channel (FC) network technology, and/or the Serial Attached SCSI (SAS) protocol or the like in the context of Direct Attached Storage (DAS).

Figure 3:
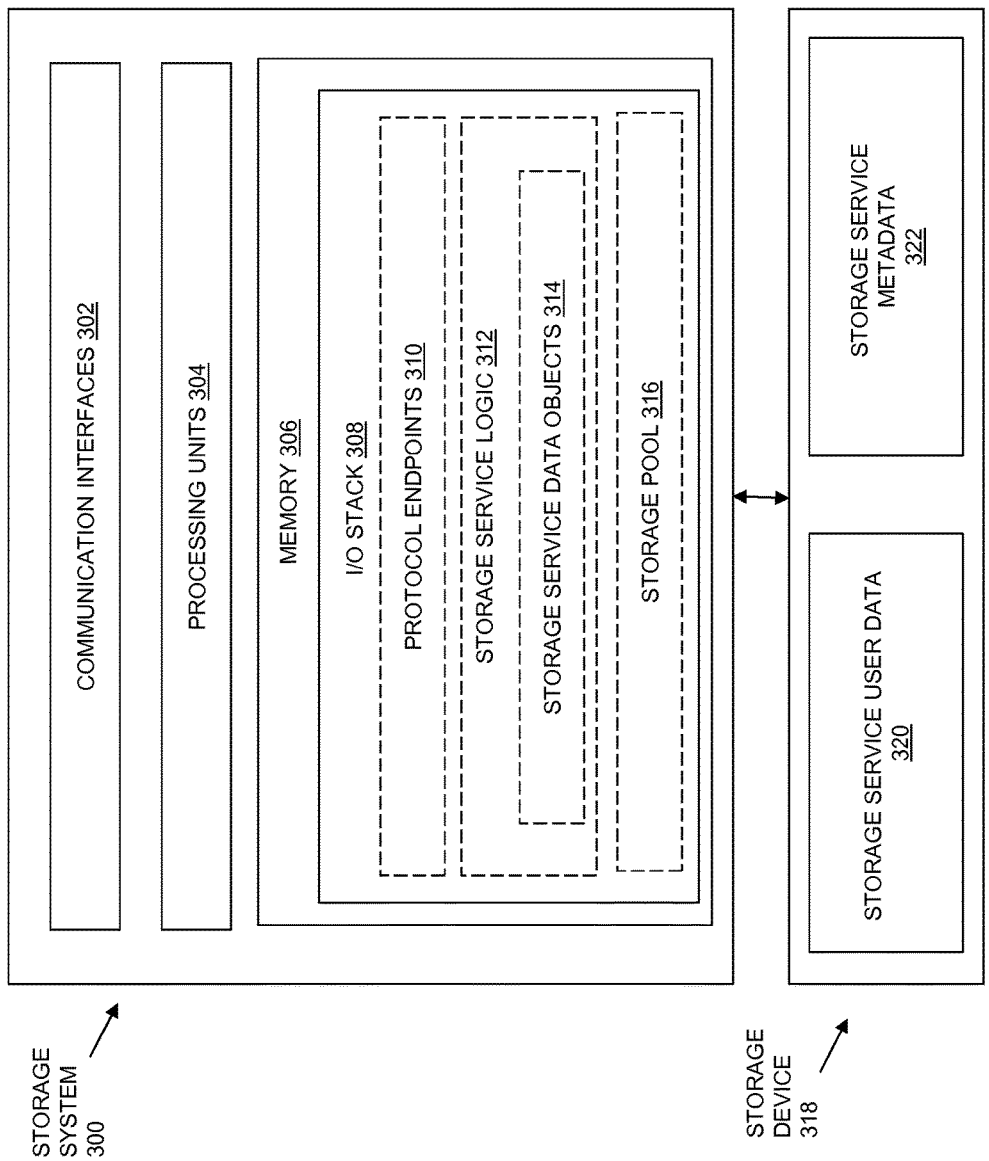
FIG. 3 is a block diagram showing an example of a storage system and a storage device, and showing the storage device containing both the user data for a storage service and the metadata for the storage service.

FIG. 3 is a block diagram showing an example of a Storage System 300 and a Storage Device 318. The Storage System 300 operates to receive I/O requests from a client system while providing a storage service to the client system, according to both block-based and file-based protocols, and to respond to such I/O requests by reading user data from or writing user data to the Storage Device 318. In the embodiment of FIG. 3, the Storage System 300 includes one or more Communication Interfaces 302, a set of Processing Units 304, and Memory 306. The Communication Interfaces 302 include, for example, SCSI target adapters and network interface adapters for converting electronic and/or optical signals received over a network into electronic form for use by the Storage System 300. The set of Processing Units 304 includes one or more processing chips and/or assemblies. The Memory 306 includes both volatile memory (e.g., RAM), and non-volatile memory, such as one or more ROMs, disk drives, solid state drives, and the like. The set of Processing Units 304 and the Memory 306 together form control circuitry, which is constructed and arranged to carry out various methods and functions as described herein, e.g., alone or in coordination with similar control circuitry on one or more other data storage systems. The Memory 306 includes a variety of software constructs realized in the form of executable instructions. When the executable instructions are run by the set of processing units 304, the set of Processing Units 304 are caused to carry out the operations of the software constructs. Although certain software constructs are specifically shown and described, it is understood that the memory 306 may include various other software constructs, which are not shown, such as an operating system, various applications, processes, and/or daemons.

In the illustrative embodiment of FIG. 3, the Memory 306 includes an I/O Stack 308. The I/O Stack 308 provides an execution path for I/O requests received from client systems while providing one or more storage services to the client systems. The I/O Stack 308 is shown including Protocol End Points 220, Storage Service Logic 312, and Storage Pool 316. Those skilled in the art will also recognize that the I/O Stack 308 shown in FIG. 3 is simplified for purposes of concise explanation and illustration of the disclosed system, and that various components and/or elements other than those shown in FIG. 3 may also be present in the I/O Stack 308. While I/O requests received from client systems enter the I/O Stack 308 from the top and propagate downwards, the components of the I/O Stack 308 are described herein from the bottom to the top for ease of understanding.

The Storage Pool 316 organizes elements of the Storage Device 318 into units of storage used by the Storage System 300 to provide one or more storage services. For example, in one embodiment, the Storage Pool 318 organizes elements of the Storage Device 318 into "slices". A "slice" is an example of a unit of storage space (e.g. 256 megabytes or 1 gigabytes in size), which is derived from the Storage Device 318. The Storage Pool 316 allocates slices of the Storage Device 318 to be used by the Storage Server Logic 312 to form Storage Service Data Objects 314 that are used to support storage services provided to client systems. For example, the Storage Pool 316 may allocate slices to objects in Storage Service Data Objects 314 that support file-based storage services, such as file systems or the like, and/or file-based virtual volumes (VVols). Alternatively, the Storage Pool 316 may allocate slices for objects in Storage Service Data Objects 314 that support block-based storage services, such as logical disks or logical units (LUNs), and/or block-based virtual volumes (VVols). The Storage Pool 316 may also de-allocate slices from Storage Service Data Objects 314 if the storage provided by the slices is no longer required. In this way, the Storage Service Data Objects 314 for both file-based and block-based storage services are built upon units of storage managed by the Storage Pool 316.

The Protocol End Points 310 expose the Storage Service Data Objects 314 to client systems in for access by the client systems in accordance with respective storage service protocols. Thus, the Protocol End Points 310 may expose block-based objects (e.g., LUNs and block-based VVols) through Fiber Channel or iSCSI protocols, and/or may expose file-based objects (e.g., file systems and file-based VVols) using NFS, CIFS, or SMB protocols.

During operation of the Storage System 300, while providing a given storage service to a client system, the Storage System 300 stores both Storage Service User Data 320 and Storage Service Metadata 322 in the Storage Device 318. The Storage Service User Data 320 holds the user data received from the client system in units of storage allocated according to the Storage Pool 316. The Storage Service Metadata 322 holds the complete set of information needed to re-establish the storage service on a new storage system. For example, the Storage Service Metadata 322 maintains a set of configuration information that can be used to configure the elements of an I/O stack on a different storage system into an operational state matching in significant part a current operational state of the I/O Stack 308 in Storage System 300. Accordingly, in the event that the Storage Device 318 is removed from Storage System 300 and attached to a new storage system, the new storage system can use the information stored in Storage Service Metadata 322 to configure the I/O stack in the new storage system so that the storage service through which the Storage Service User Data 320 was received by Storage System 300 can be immediately re-started on the new storage system. Storage Service Metadata 322 is maintained by Storage System 300 beginning when the corresponding storage service is established between Storage System 300 and a client system, and continues to be maintained by Storage System 300 while the storage service is being provided to the client system.

Figure 4:
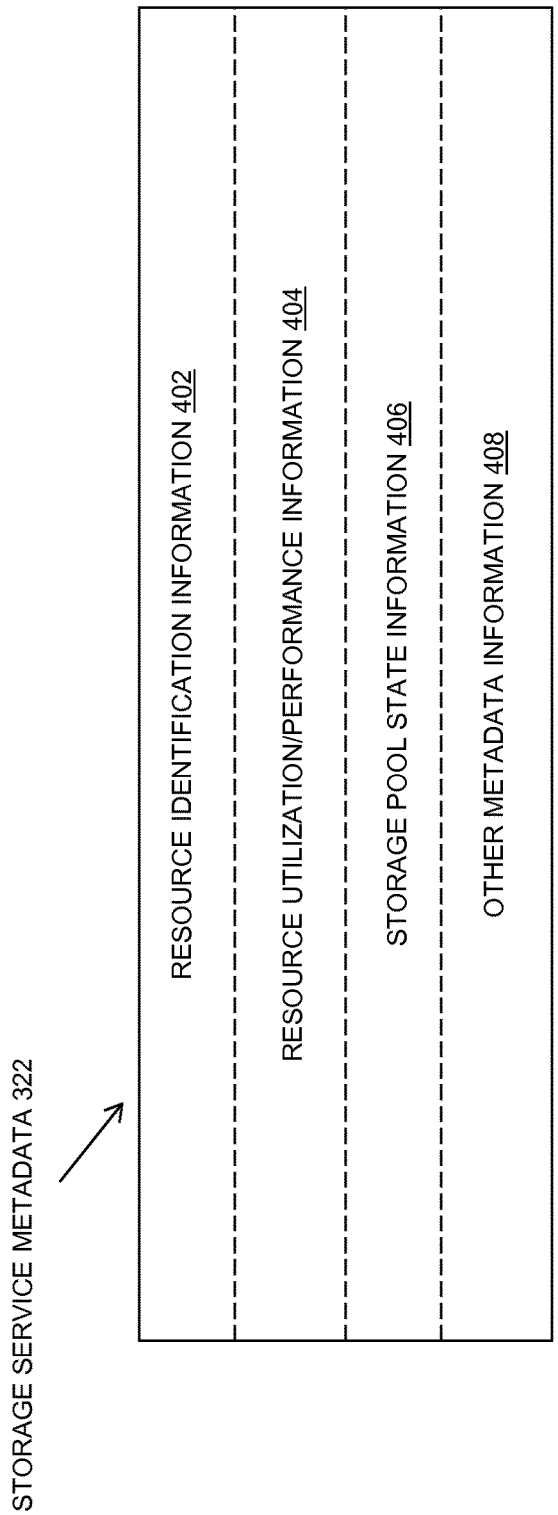
FIG. 4 is a block diagram showing an example of metadata stored for a corresponding storage service.

As shown in FIG. 4, in one embodiment, the Storage Service Metadata 322 includes Resource Identification Information 402, Resource Utilization/Performance Information 404, Storage Pool State Information 406, and Other Metadata 408. Resource Identification Information 402 includes names, addresses, or other identifiers of various types of resources needed to establish and/or maintain the storage service with the client system. Such addresses or identifiers may include Internet Protocol (IP) addresses, iSCSI Qualified Names (IQNs), or other specific types of names, addresses or identifiers needed to establish and/or maintain the corresponding storage service. For example, such addresses or identifiers may be needed to configure the protocol end points portion of the I/O stack on a new storage system in order to re-start the storage service on the new storage system. In another example, such addresses or identifiers may be used by the client system to access one or more client accessible storage service objects exposed to the client system in order to provide the storage service (e.g. LUNs and/or block-based VVols for block-based services, file systems and/or file-based VVols for file-based services). Alternatively, or in addition, such address or identifier information may be used to identify storage service objects representing similar types of internal resources, not necessarily exposed to the client system, but that are used internally by the storage system to support one or more storage services.

Resource Utilization/Performance Information 404 may include metadata describing the current and/or previous utilization and/or performance of specific resources (e.g. storage service objects), measured while providing the corresponding storage service.

Storage Pool State Information 406 may include information describing the storage pool used to allocate storage for the service. The Storage Pool State Information 406 may be sufficient such that when the storage device is moved to a new storage system, the storage pool from the original storage system can be re-constructed on the new storage system, and match the state of the storage pool on the original storage system at the time the storage device was moved. In other words, in one embodiment, the Storage Pool State Information 406 contains all the information needed to reconstruct the storage pool on a new storage system when the storage device containing the Storage Service Metadata 400 is moved to the new storage system. The Storage Pool State Information 406 may describe the organization and/or amount or size of the allocated and unallocated storage units managed by the storage pool to provide the storage service. For example, such information may include the location(s) of units of storage space on the storage device that are currently consumed by or allocated to user data associated with the service, and/or that are free and currently unallocated but available for use in providing the service. Storage Pool State Information 406 may similarly also include specific types of data describing or representing the current state of storage pool consumption, such as the current number of consumed bytes managed by the storage pool, the current number of free bytes managed by the storage pool, and/or other such storage pool-related resource consumption information.

Storage Pool State Information 406 may, for example, also include information describing structures such as storage service objects built on the allocated portion of the storage pool. Such information allows those storage service objects to be re-created by the new storage system using the reconstructed storage pool on the new storage system after the storage device has been moved to the new storage system. For example, the Storage Pool State Information 406 may include information describing the location and current state of a number of logical units (LUNs) that have been allocated through the storage pool. Such state information may, for example, include a number and a location on the storage device for some number of LUNs allocated through the storage pool.

The Storage Service Metadata 400 may further include other specific types of information necessary to re-establish the associated storage service on a new storage system, as for example shown by Other Metadata Information 408 in FIG. 4.

Figure 5:
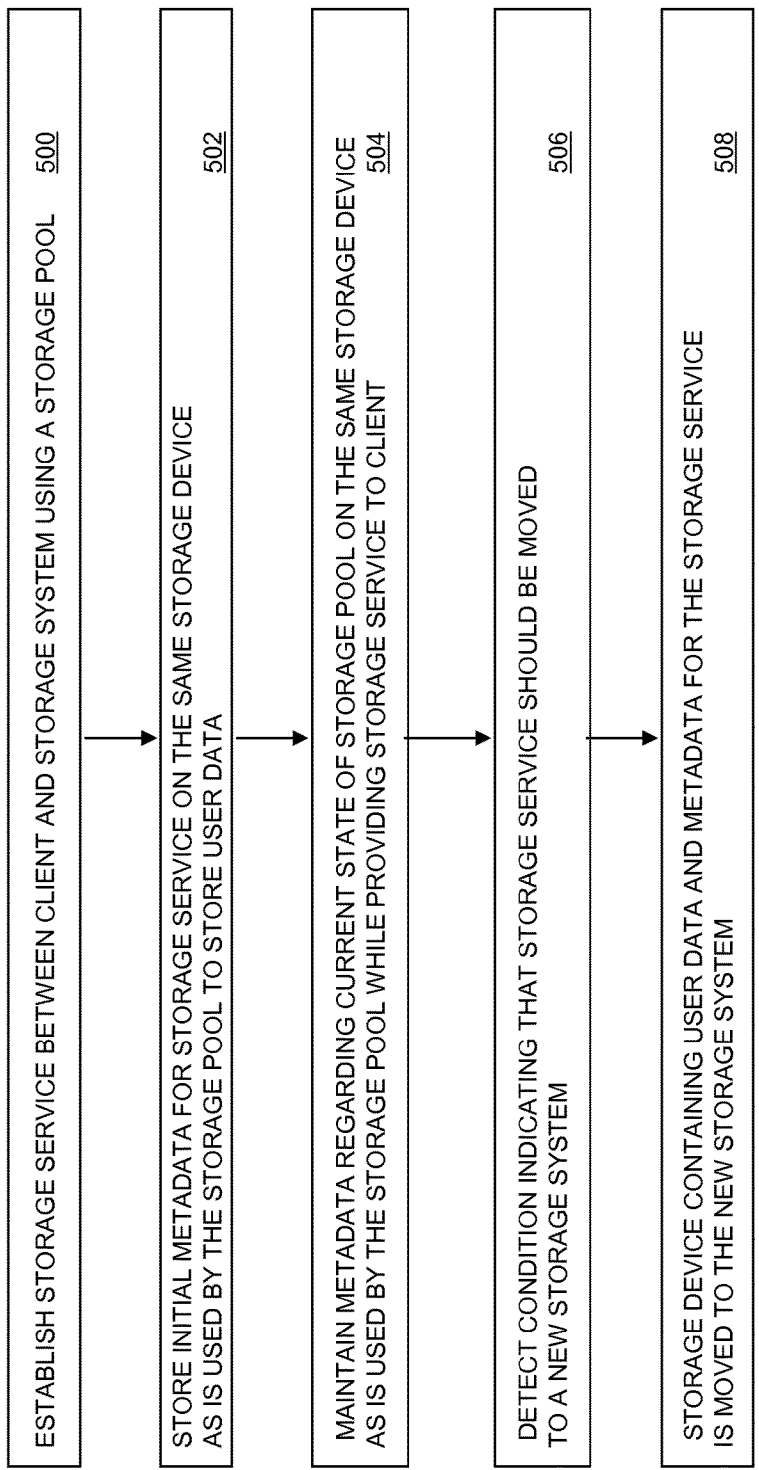
FIG. 5 is a flow chart showing steps performed during operation off an illustrative embodiment to maintain storage service metadata together with the user data for a storage service.

FIG. 5 is a flow chart showing steps performed during operation of an illustrative embodiment to maintain storage service metadata together with the storage pool for a storage service. The steps of FIG. 5 may, for example be performed in whole or in part by one or more components of an original storage system, having components such as those shown in the illustrative Storage System 300 of FIG. 3. In such an original storage system, individual steps of FIG. 5 may be performed by various specific components shown in the Storage System 300 of FIG. 3, including but not limited to the Storage Service Logic 312.

At step 500, the storage system establishes a storage service between the storage server and a client system. The storage system provides the storage service using a storage pool (e.g. Storage Pool 316) to allocate storage from a storage device in order to store user data received from the client system. At step 502, the storage system stores initial metadata describing the storage service onto the storage device. At step 504, the storage system continuously maintains storage service metadata (e.g. Storage System Metadata 400) describing the current state of the storage pool and/or other components of the storage system used to provide the storage service, again on the same storage device from which units of storage are allocated to store user data received from the client system, while providing the storage service from the storage system.

At step 506, the disclosed system detects that a condition has arisen indicating that the storage service should be moved to a new storage system. Various conditions may be detected at step 506 that indicate that an established storage service needs to be moved to a new storage system. For example, the disclosed system may automatically detect that the level of performance provided by the underlying storage system to the storage service does not meet a predefined minimum required performance level. Alternatively, at step 506 the disclosed system may automatically detect that a failure or fault condition has occurred within or on the original storage system providing the storage service. In another example, the disclosed system may automatically determine that the storage service should be moved to another storage system in order to provide better load balancing across storage systems. Other specific conditions may be detected at step 506 that also require that the storage service be moved from one storage system to another.

At step 508, the storage device containing the user data and metadata for the storage service is moved to a new storage system. The storage device may be physically disconnected from the original storage system and then physically reconnected to the new storage system, but the disclosed system is not limited to such an approach. Alternatively, in an embodiment in which the storage device is communicably connected to both the original and the new storage system, for example by way of a data communication network such as a SAN or the like, the storage device may be moved by reassigning the storage device, or by reconfiguring the original and/or new storage system and/or the storage device itself (e.g. through changing settings in configuration software, firmware, and/or configuration switches), such that the storage device is no longer available to the original storage system, but instead is available only to new storage system. In another alternative embodiment, in which a mirrored copy of the storage device is maintained by the new storage system, moving the storage device at step 508 may involve activating the mirrored copy of the storage device on the new storage system.

Figure 6:
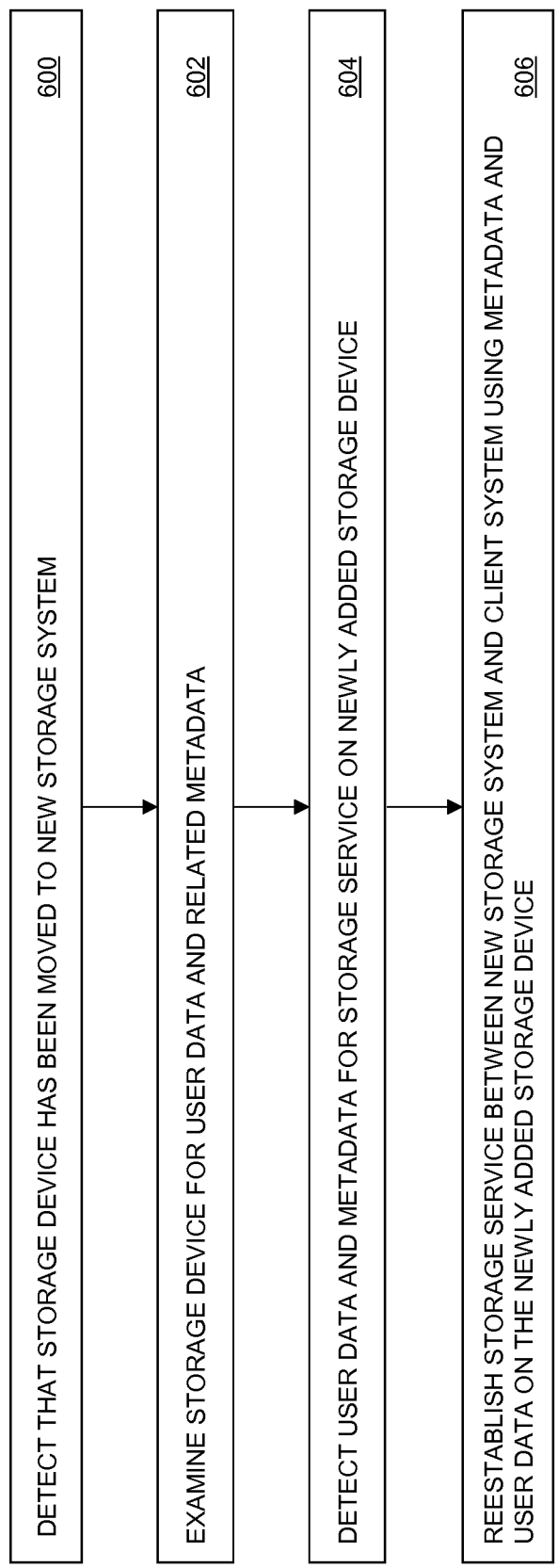
FIG. 6 is a flow chart showing steps performed during operation of an illustrative embodiment to re-establish a storage service in response to a storage device containing both storage service metadata and user data for the service being moved to a new storage system.

FIG. 6 is a flow chart showing steps performed during operation of an illustrative embodiment to re-establish a storage service in response to a storage device containing storage service metadata and user data for the service being moved to a new storage system. The steps of FIG. 6 may, for example be performed in whole or in part by one or more components of a new storage system, to which the storage device is moved. The new storage system may have components such as those shown in the illustrative Storage System 300 of FIG. 3. In such a new storage system, the steps of FIG. 6 may be performed by various specific components shown in the Storage System 300 of FIG. 3, including but not limited to the Storage Service Logic 312.

At step 600, the disclosed system detects that the storage device has been moved to the new storage system. For example, the storage system may detect that the storage device has been physically connected to the new storage system. Alternatively, the new storage system may detect that the storage device has been moved to the new storage system by reassigning or re-allocating the storage device, or by reconfiguring the original and/or new storage system and/or the storage device itself such that the storage device is no longer available to the original storage system, but instead is available only to new storage system. In another alternative embodiment, the new storage system may detect that the storage device has been moved by detecting that a mirrored copy of the storage device has been activated on the new storage system.

At step 602, the new storage system reads some or all of the contents of the storage device to determine whether the storage device contains user data and metadata for a storage service. At step 604, the new storage system detects the user data and the storage service metadata for the service being moved on the storage device.

At step 606, the new storage system re-establishes the storage service between the client system and the new storage system, using the user data and storage service metadata for the service found by the new storage system on the storage device. Step 606 may include using resource identification information (e.g. names, addresses or other identifiers of resources) contained in the storage service metadata to re-establish the storage service with the client system. For example, the new storage system may use resource identifiers from the metadata to configure protocol end points in the I/O stack on the new storage system so that the client system can continue to use the same resource identifiers as were used by the client system to access external storage when the storage service was provided from the original storage system. Such resource identifiers in the storage service metadata may also or alternatively be used at step 606 when re-creating storage service objects for the service to re-establish the service on the new storage system, so that the same resource identifiers can be used by the client system when using the storage service on the new storage system as were used when the storage service was provided by the original storage system. Such resource identifiers in the metadata may be used at step 606 to re-establish the storage service such that those resource identifiers may continue to be used by the client system to access client accessible storage service objects (e.g. LUNs and/or block-based VVols for block-based services, file systems and/or file-based VVols for file-based services) when the service is re-established on the new storage system. The new storage system may further use resource identifiers from the metadata to re-create objects representing similar types of internal resources, not necessarily exposed to the client system, but that are used internally by the new storage system to support the storage service.

Further at step 606, while re-establishing the service, the new storage system may access resource utilization/performance information in the metadata so that monitoring of the storage service on the new storage system going forward can reflect the previous utilization/performance of resources associated with the storage service when the storage service was provided by the original storage system.

Also at step 606, the new storage system may use the storage pool state information in the storage service metadata from the storage device to re-construct the storage pool used to support the storage service on the new storage system. The storage pool state information in the storage service metadata may also be used by the new storage system to re-create structures such as storage service objects built on the allocated portion of the storage pool.

The disclosed system provides significant advantages over previous systems. In particular, the disclosed system avoids the costs associated with separately copying storage service metadata from an original storage system to a new storage system when a previously established storage service is moved. The disclosed system accordingly enables the storage service to be quickly re-started on the new storage system in response to the storage device containing the metadata and the user data being moved to the new storage system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable storage medium(s) may be utilized. The computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The disclosed system can take the form of an entirely software-based embodiment, an entirely hardware-based embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing services mobility, comprising:
providing a storage service from a first storage system to a client system, wherein providing the storage service includes
allocating, by the first storage system, units of storage space located on a storage device, wherein the storage device comprises a single magnetic disk drive, and wherein the storage device is initially communicably coupled to the first storage system,
receiving user data at the first storage system from the client system, and
storing, by the first storage system, the received user data into the allocated units of storage space located on the storage device;
storing, by the first storage system on the storage device while providing the storage service from the first storage system to the client system and while the storage device is physically connected to the first storage system, a set of storage service metadata describing resources used by the first storage system to provide the storage service to the client system, wherein the storage service metadata stored on the storage device includes I/O stack configuration information regarding a current operational state of an I/O stack located in the first storage system, wherein the I/O stack configuration information in the storage service metadata stored by the first storage system on the storage device includes storage pool state information for a storage pool used by the first storage system to provide the storage service from the first storage system to the client system, wherein the storage pool state information includes i) locations on the storage device of units of storage space that are currently allocated to store user data associated with the service, and ii) locations on the storage device of units of storage space that are currently available to store user data associated with the service;

detecting, by a second storage system, that the storage device has been physically moved from the first storage system to the second storage system, by detecting that the storage device has been physically connected to the second storage system;

scanning the storage device, by the second storage system in response to detecting that the storage device has been physically moved from the first storage system to the second storage system, for the storage service metadata and the user data; and re-establishing, by the second storage system, automatically and without user intervention in response to the second storage system detecting that both i) the storage device has been physically moved to the second storage system and ii) the storage service metadata and the user data are stored on the storage device, and using the storage service metadata and user data previously stored on the storage device by the first storage system, the storage service from the second storage system to the client system, wherein the re-establishing includes reconstructing, on the second storage system using the storage pool state information stored on the storage device, the storage pool previously used by the first storage system to provide the storage service from the first storage system to the client system.

2. The method of providing services mobility of claim 1, further comprising:

wherein storing the set of storage service metadata includes storing resource identification information including at least one identifier of one of the resources used by the first storage system to provide the storage service to the client system; and wherein re-establishing the storage service from the second storage system to the client system includes using the at least one identifier of one of the resources used by the first storage system to provide the storage service to the client system to recreate the at least one resource on the second storage system such that the resource has the same identifier on the second storage system as it did on the first storage system.

3. The method of providing services mobility of claim 2, further comprising:

wherein providing the storage service from the first storage system to the client system further includes exposing the one of the resources used by the first storage system to provide the storage service to the client system so that the client system can access the resource using an Internet Protocol (IP) address of the resource;

wherein storing the storage service metadata includes storing the Internet Protocol (IP) address of the resource in the storage service metadata; and wherein re-establishing the storage service from the second storage system to the client system includes using the Internet Protocol (IP) address of the resource in the storage service metadata to recreate the resource on the second storage system so that the client system can use the Internet Protocol (IP) address to access the resource on the second storage system using the Internet Protocol (IP) address.

4. The method of providing services mobility of claim 2, further comprising:

wherein providing the storage service from the first storage system to the client system further includes exposing the one of the resources used by the first storage system to provide the storage service to the client system so that the client system can access the resource using an iSCSI Qualified Name (IQN) of the resource;

wherein storing the storage service metadata includes storing the iSCSI Qualified Name (IQN) of the resource in the storage service metadata; and wherein re-establishing the storage service from the second storage system to the client system includes using the iSCSI Qualified Name (IQN) of the resource in the storage service metadata to recreate the resource on the second storage system so that the client system can use the iSCSI Qualified Name (IQN) to access the resource on the second storage system using the iSCSI Qualified Name (IQN).

5. The method of providing services mobility of claim 2, wherein the storage service comprises a file-based service, wherein the one of the resources used by the first storage system to provide the storage service to the client system comprises a file system, and further comprising:

wherein storing the set of storage service metadata includes storing an identifier of the file system in the resource identification information in the storage services metadata; and wherein re-establishing the storage service from the second storage system to the client system includes using the identifier of the file system to enable external service of the file system from the second storage system such that the file system has the same identifier on the second storage system as it did on the first storage system.

6. The method of providing services mobility of claim 2, wherein the storage service comprises a block-based service, wherein the one of the resources used by the first storage system to provide the storage service to the client system comprises a logical unit (LUN), and further comprising:

wherein storing the set of storage service metadata includes storing an identifier of the logical unit (LUN) in the resource identification information in the storage services metadata; and wherein re-establishing the storage service from the second storage system to the client system includes using the identifier of the logical unit (LUN) to recreate the logical unit (LUN) on the second storage system such that the logical unit (LUN) has the same identifier on the second storage system as it did on the first storage system.

7. The method of providing services mobility of claim 1, further comprising:

wherein storing the set of storage service metadata includes storing storage pool state information that describes the amount of storage allocated to provide the storage service to the client system; and wherein re-establishing the storage service from the second storage system to the client system includes using the storage pool state information that describes the amount of storage allocated to provide the storage service to the client system to reconstruct the storage pool on the second storage system.

8. The method of providing services mobility of claim 1, further comprising:

wherein storing the set of storage service metadata includes storing resource identification information including at least one identifier of one of the resources used by the first storage system to provide the storage service to the client system;

wherein the identifier of the one of the resources used by the first storage system to provide the storage system to the client system comprises an identifier of an internal resource that is used internally by the first storage system to provide the storage service to the client system and that is not exposed to the client system; and wherein re-establishing the storage service from the second storage system to the client system includes using the at least one identifier of one of the resources used by the first storage system to provide the storage service to the client system to recreate the internal resource on the second storage system such that the internal resource has the same identifier on the second storage system as it did on the first storage system.

9. The method of claim 1, wherein re-establishing the storage service from the second storage system to the client system further comprises:

configuring an I/O stack located in the second storage system using the I/O stack configuration information in the storage service metadata that is stored on the storage device to re-establish the storage service from the second storage system to the client system.

10. The method of claim 9, wherein the I/O stack located in the first storage system provides an execution path for I/O requests received by the first storage system from the client system while the first storage system provides the storage service from the first storage system to the client system.

11. The method of claim 1, wherein the storage pool organizes the storage device into slices of storage space located on the storage device;

wherein each one of the units of storage space located on the storage device comprises one of the slices of storage space located on the storage device; and wherein allocating the units of storage space located on the storage device comprises allocating at least one of the slices to at least one storage service data object that supports the storage service.

12. The method of claim 11, wherein the storage service comprises a block-based service; and wherein the storage service data object that supports the storage service comprises a logical unit (LUN).

13. The method of claim 11, wherein the storage service comprises a file-based service; and wherein storage service data object that supports the storage service comprises a file system.

14. The method of claim 1, wherein storing the set of storage service metadata on the storage device comprises continuously maintaining the set of storage service metadata on the storage beginning when the storage service is established from the first storage system to the client system and subsequently while the storage service is provided from the first storage system to the client system.

15. A system for providing services mobility, comprising:

a first storage system, the first storage system comprising
at least one processor,
at least one memory storing program code that, when executed on the processor, performs the steps of
providing a storage service from the first storage system to a client system, wherein providing the storage service includes
allocating units of storage located on a storage device, wherein the storage device comprises a single magnetic disk drive, and wherein the storage device is initially communicably coupled to the first storage system,
receiving user data at the first storage system from the client system, and
storing, by the first storage system, the received user data into the allocated units of storage space located on the storage device, and
storing, on the storage device while providing the storage service from the first storage system to the client system and while the storage device is physically connected to the first storage system, a set of storage service metadata describing resources used by the first storage system to provide the storage service to the client system, wherein the storage service metadata stored on the storage device includes I/O stack configuration information regarding a current operational state of an I/O stack located in the first storage system, wherein the I/O stack configuration information in the storage service metadata stored by the first storage system on the storage device includes storage pool state information for a storage pool used by the first storage system to provide the storage service from the first storage system to the client system, wherein the storage pool state information includes i) locations on the storage device of units of storage space that are currently allocated to store user data associated with the service, and ii) locations on the storage device of units of storage space that are currently available to store user data associated with the service; and a second storage system, the second storage system comprising
at least one processor,
at least one memory storing program code that, when executed on the processor, performs the steps of
detecting that the storage device has been physically moved from the first storage system to the second storage system, by detecting that the storage device has been physically connected to the second storage system,
scanning the storage device, by the second storage system in response to detecting that the storage device has been physically moved from the first storage system to the second storage system, for the storage service metadata and the user data; and
re-establishing, automatically and without user intervention in response to detecting that both i) the storage device has been physically moved to the second storage system and ii) the storage service metadata and the user data are stored on the storage device, and using the storage service metadata and user data previously stored on the storage device by the first storage system, the storage service from the second storage system to the client system, wherein the re-establishing includes reconstructing, on the second storage system using the storage pool state information stored on the storage device, the storage pool previously used by the first storage system to provide the storage service from the first system to the client system.

16. The system for providing services mobility of claim 15, further comprising:
   wherein the program code stored in the memory of the first storage system, when executed on the processor in the first storage system, stores the set of storage service metadata at least in part by storing resource identification information including at least one identifier of one of the resources used by the first storage system to provide the storage service to the client system; and
   wherein the program code stored in the memory of the second storage system, when executed on the processor in the second storage system, re-establishes the storage service from the second storage system to the client system at least in part by using the at least one identifier of one of the resources used by the first storage system to provide the storage service to the client system to recreate the at least one resource on the second storage system such that the resource has the same identifier on the second storage system as it did on the first storage system.

17. The system for providing services mobility of claim 16, further comprising:
   wherein the program code stored in the memory of the first storage system, when executed on the processor in the first storage system, provides the storage service from the first storage system to the client system at least in part by exposing the one of the resources used by the first storage system to provide the storage service to the client system so that the client system can access the resource using an Internet Protocol (IP) address of the resource;
   wherein the program code stored in the memory of the first storage system, when executed on the processor in the first storage system, stores the storage service metadata at least in part by storing the Internet Protocol (IP) address of the resource in the storage service metadata; and
   wherein the program code stored in the memory of the second storage system, when executed on the processor in the second storage system, re-establishes the storage service from the second storage system to the client system at least in part using the Internet Protocol (IP) address of the resource in the storage service metadata to recreate the resource on the second storage system so that the client system can use the Internet Protocol (IP) address to access the resource on the second storage system using the Internet Protocol (IP) address.

18. The system for providing services mobility of claim 17, further comprising:
   wherein the program code stored in the memory of the first storage system, when executed on the processor in the first storage system, provides the storage service from the first storage system to the client system further at least in part by exposing the one of the resources used by the first storage system to provide the storage service to the client system so that the client system can access the resource using an iSCSI Qualified Name (IQN) of the resource;
   wherein the program code stored in the memory of the first storage system, when executed on the processor in the first storage system, stores the storage service metadata at least in part by storing the iSCSI Qualified Name (IQN) of the resource in the storage service metadata; and
   wherein the program code stored in the memory of the second storage system, when executed on the processor in the second storage system, re-establishes the storage service from the second storage system to the client system at least in part using the iSCSI Qualified Name (IQN) of the resource in the storage service metadata to recreate the resource on the second storage system so that the client system can use the iSCSI Qualified Name (IQN) to access the resource on the second storage system using the iSCSI Qualified Name (IQN).

19. The system for providing services mobility of claim 16, wherein the storage service comprises a file-based service, wherein the one of the resources used by the first storage system to provide the storage service to the client system comprises a file system, and further comprising:
   wherein the program code stored in the memory of the first storage system, when executed on the processor in the first storage system, stores the set of storage service metadata at least in part by storing an identifier of the file system in the resource identification information in the storage services metadata; and
   wherein the program code stored in the memory of the second storage system, when executed on the processor in the second storage system, re-establishes the storage service from the second storage system to the client system at least in part using the identifier of the file system to enable external service of the file system from the second storage system such that the file system has the same identifier on the second storage system as it did on the first storage system.

20. The system for providing services mobility of claim 16, wherein the storage service comprises a block-based service, wherein the one of the resources used by the first storage system to provide the storage service to the client system comprises a logical unit (LUN), and further comprising:
   wherein the program code stored in the memory of the first storage system, when executed on the processor in the first storage system, stores the set of storage service metadata at least in part by storing an identifier of the logical unit (LUN) in the resource identification information in the storage services metadata; and
   wherein the program code stored in the memory of the second storage system, when executed on the processor in the second storage system, re-establishes the storage service from the second storage system to the client system at least in part using the identifier of the logical unit (LUN) to recreate the logical unit (LUN) on the second storage system such that the logical unit (LUN) has the same identifier on the second storage system as it did on the first storage system.

21. The system for providing services mobility of claim 15, further comprising:
   wherein the program code stored in the memory of the first storage system, when executed on the processor in the first storage system, stores the set of storage service metadata at least in part by storing storage pool state information that describes the amount of storage allocated to provide the storage service to the client system; and
   wherein the program code stored in the memory of the second storage system, when executed on the processor in the second storage system, re-establishes the storage service from the second storage system to the client system at least in part using the storage pool state information that describes the amount of storage allocated to provide the storage service to the client system to reconstruct the storage pool on the second storage system.

22. A computer program product, comprising:

a non-transitory computer readable medium which stores a set of instructions to provide services mobility, the set of instructions, when carried out by computer circuitry, causing the computer circuitry to perform a method of:
  providing a storage service from a first storage system to a client system, wherein providing the storage service includes
    allocating, by the first storage system, units of storage space located on a storage device, wherein the storage device comprises a single magnetic disk drive, and wherein the storage device is initially communicably coupled to the first storage system,
    receiving user data at the first storage system from the client system, and
    storing, by the first storage system, the received user data into the allocated units of storage space located on the storage device;
  storing, by the first storage system on the storage device while providing the storage service from the first storage system to the client system and while the storage device is physically connected to the first storage system, a set of storage service metadata describing resources used by the first storage system to provide the storage service to the client system, wherein the storage service metadata stored on the storage device includes I/O stack configuration information regarding a current operational state of an I/O stack located in the first storage system, wherein the I/O stack configuration information in the storage service metadata stored by the first storage system on the storage device includes storage pool state information for a storage pool used by the first storage system to provide the storage service from the first storage system to the client system, wherein the storage pool state information includes i) locations on the storage device of units of storage space that are currently allocated to store user data associated with the service, and ii) locations on the storage device of units of storage space that are currently available to store user data associated with the service;
  detecting, by a second storage system, that the storage device has been physically moved from the first storage system to the second storage system, by detecting that the storage device has been physically connected to the second storage system;
  scanning the storage device, by the second storage system in response to detecting that the storage device has been physically moved from the first storage system to the second storage system, for the storage service metadata and the user data; and
  re-establishing, by the second storage system, automatically and without user intervention in response to detecting that both i) that the storage device has been physically moved to the second storage system and ii) the storage service metadata and the user data are stored on the storage device, and using the storage service metadata and user data previously stored on the storage device by the first storage system, the storage service from the second storage system to the client system, wherein the re-establishing includes reconstructing, on the second storage system using the storage pool state information stored on the storage device, the storage pool previously used by the first storage system to provide the storage service from the first storage system to the client system.

* * * * *